Patented Oct. 20, 1936

2,058,162

UNITED STATES PATENT OFFICE 2,058,162

PROCESS FOR TREATING FATTY OILS TO REMOVE OFF TASTE AND STABILIZE SAME AGAINST RANCIDITY

Clarence E. Macke, Baltimore, Md.

No Drawing. Application April 28, 1933,
Serial No. 668,471

3 Claims. (Cl. 87—12)

The object of my invention is a product of oil having a new and individual characteristic.

A further object of my invention is the treating of edible oils and fats with a sesqui-terpene radical.

A further object of my invention is a product of the process herein described.

A further object of my invention is the treating of oils to effect the enzymes thereof.

A further object of my invention is the elimination of undesirable properties from the oils of the animal (fish) and vegetable groups.

With the foregoing and other objects in view, my invention consists of the methods employed, elements and products thereof specifically set forth herein, but it is understood that changes, variations and modifications may be resorted to which come within the scope of the claims hereunto appended.

Certain oils, fats and other substances, especially those adapted for human consumption, have characteristics of taste and smell that it may be desirable to remove; as illustrative, castor oil, cod liver oil, haliver oil, the fish oils, and even animal fats, including butter.

I will first discuss butter and its characteristics of rancidity. The butter fats, even when washed and the moisture and surrounding butter-milk have been completely removed, are still subject to rancidity owing to the presence of probably enzymes and a volatile fatty acid which oxidizes very slowly in the presence of the animal fats or oils. The object of my invention is to remove this fatty acid volatile oil and decomposition protein products and treat the enzymes so that the fixation of the other fats and oils in butter becomes permanent, which change allows of practically no further rancidity. To accomplish this I flush the butter with a solution containing a sesqui-terpene radical derivative. I have discovered that this flushing attacks, or has an affinity with, the undesirable elements, and upon the elimination of the water or fluid carrier the undesirable elements are removed from the butter, and in place thereof if any trace is left it is that of the radical above mentioned.

Castor oil is particularly susceptible to treatment by my process, and forms a product under the claims hereof. As is well-known, castor oil because of its taste and smell is objectionable to most people. This property of castor oil is caused by the volatile fatty acid, decomposition protein products and enzymes which cause its peculiar characteristics. This volatile fatty acid, together with certain of the ptomaine contents, as in the case of butter, is easily attacked, subdued and removed, in most part, by the sesqui-terpene radical above mentioned; and after the carrier has been removed with the superfluous radical and the attacked volatile element, there remains in the oil, so far as may be detected by the human sense, only the taste of the radical.

Cod-liver oil is also particularly susceptible to treatment by my process, and forms a product under the claims hereof. As is well-known, cod-liver oil, because of its taste and smell, is obnoxious to many people. This property is caused probably by the volatile fatty acids and ptomaines contained therein. These fatty acids and ptomaines are easily attacked, subdued and/or removed in most part by the sesqui-terpene radical mentioned above.

In this treatment as briefly outlined above, there probably exists a very complex action involving enzymes and ferments; there are probably enzymes present that act with the radical catalytically as a fixation element to prevent further ferments and probably eliminate the major part of the obnoxious decomposition protein products. I might refer to the illustration given in Simon's Manual of Chemistry (1916 Ed.), page 598, Iso-amylamine, $C_5H_{13}N$, a colorless, strongly alkaline liquid, has been found in putrefying yeast and in cod-liver oil. This substance probably is attacked by the radical and eliminated or activated.

By investigating a large number of the oils and fats, fish oil, animal oils and vegetable oils, volatile and non-volatile, I have discovered that the so-called non-volatile oils contain a volatile element, and that is the element which causes the break-down of the non-volatile oil to a more or less extent. In other words, probably not so much of a break-down effect as the possible formation by oxidation of an undesirable content of said oil, which is the element I desire to remove.

I have discovered that when the sesqui-terpene $C_{15}H_{24}$, or a terpene $C_{10}H_{16}$, or a substance of the radical terpene, is placed in an aqueous solution prepared preferably at a temperature of over 212° Fahrenheit, this radical terpene becomes active in its application as hereinafter set forth.

Specifically illustrating, I make an aqueous solution by boiling celery and use this solution to wash the butter, in which solution the butter is worked and washed, removing the rancidity and leaving an agreeable tasting substance. I have also used Salvia (sage) with butter.

In the case of butter, however, which is peculiarly formed, this infusion should be mixed with the cream before churning and eliminated with the butter-milk. Specifically, I use 10% in solution of celery or sage formed by adding 1 lb. of either to 1 gallon of water and boiling the same for ten minutes. These properties, the time of boiling and the method of mixing, are immaterial and can be varied to a great extent. In the case of cod-liver oil, I make an infusion of sage similar to that referred to in the case of butter, using 6 oz. of the fluid infusion of sage prepared as above, cooled to a gallon of the oil. The cooling is desirable from the fact that vitamin "A", supposedly contained in cod-liver oil, is supposedly destroyed at a temperature considerably over 100° F. The above proportions are rather immaterial, enough being used to insure a substantial elimination of the undesirable element.

The mixture is agitated for a considerable time; I have found that occasional agitation within a period of 72 hours gives satisfactory results. A quiescent period of perhaps 48 hours is had, at the end of which time the water, or infusion, or carrier of the radical settles and the treated oil may be siphoned or removed from the same in substantially pure condition that will keep and be tasteless so far as the removed element is concerned.

The other oils above mentioned are treated in substantially the same way with an element of the radical mentioned, the proportions not being essential for my process.

In the treating of cod-liver oil, or castor oil, or any other oil, when medicinal properties are desired it has been found that a temperature of between 65 and 80° F. is preferable as a working temperature during the agitation period.

In this specification and claims, when I use the term "oil", I mean oil without reference to temperature. It may be solidified such as lard, or fluid such as cod-liver oil, or ordinarily known as oil; butter and lard are examples of this.

In the treating of lard with the sesqui-terpene radical I have found that an aqueous solution of celery, obtained by boiling ground celery seeds, say 6 oz. of seed to 2 qts. of water for five minutes, gives a satisfactory radical in a water carrier; the proportions are immaterial and may be varied within a wide range. The decoction above mentioned is allowed to cool and is decanted. In the case of lard, I use 10% volume of the above aqueous solution to the warm or melted lard.

Where precautions do not have to be taken as to temperature with therapeutic effect, it is desirable to work at temperature above the melting points of the fat; in the example given, the lard. In the agitation of lard thus heated (about 200° F.), an agitation of about two hours is sufficient to protect the lard from rancidity thereafter. In the case of butter, such a temperature would tend to melt the butter globules in the cream; in that case, a lower temperature and the agitation of the churning is sufficient to practically render the butter immune from rancidity.

In the case of castor-oil, heat may be applied as was done in the case of the lard, and a shorter time is involved than that required for cod-liver oil, which was treated cool.

I do not wish to limit myself to the proportions, temperatures, or substances involved in this process, as a very wide range—almost unlimited—is effective in a more or less degree. I have simply given what I have found to be desirable strength, proportions and temperatures for the substances operated upon.

The sesqui-terpene radical involving Salvia (sage) for use in butter and cod-liver oil, I prepare as follows: I use 6 oz. of powdered sage to 2 qts. of water, and boil for about five minutes, decanting and allowing to cool. This is the water carrier solution of sage containing probably enzymes contained in the sage. This I use, as was suggested for celery; that is, 10% by volume of the solution to 90% of the cod-liver oil, or other oils involved.

I might theorize somewhat and give the results obtained by the use of cod-liver oil treated under this process.

I would like to call attention to the fact that there is a vast difference between oils and fats; for example, in the above examples of the application of my process, lard and butter are fats, whereas, castor-oil, cod-liver oil, haliver oil and the fish oils are oils under the definition recognized in chemistry.

I will call attention to the difference between fats and oils, or fats in oils; illustrating, lard, which contains palmitin and stearine, with some olein. In other words, lard is a mixture of what is known as lard oil, a fluid at ordinary temperatures, and stearine, a solid at ordinary temperatures, the lard oil being subject to putrefaction, and the stearine being fixed comparatively as to its destructive qualities. It is the lard oil which by my treatment becomes stable and not prone to rancidity when mixed with the stearine in lard. In other words, I treat the oils in which the fats are suspended and not the fats.

Having thus described my invention, what I claim and desire to secure by Letters Patent is:

1. The process of treating an edible oil consisting of agitating therewith an aqueous infusion of sage whereby a precipitate is obtained, then separating the treated oil from the precipitate and the aqueous solution and its contents.

2. The process of treating an edible oil consisting of, agitating therewith an aqueous infusion of celery whereby a precipitate is obtained, then separating the treated oil from the precipitate and the aqueous solution and its contents.

3. A new product, a glyceride oil stabilized against rancidity by that portion of the aqueous extract of the group consisting of celery or sage which possesses a solubility preference in said oil.

CLARENCE E. MACKE.